United States Patent
Fan et al.

(10) Patent No.: US 7,475,070 B2
(45) Date of Patent: Jan. 6, 2009

(54) SYSTEM AND METHOD FOR TREE STRUCTURE INDEXING THAT PROVIDES AT LEAST ONE CONSTRAINT SEQUENCE TO PRESERVE QUERY-EQUIVALENCE BETWEEN XML DOCUMENT STRUCTURE MATCH AND SUBSEQUENCE MATCH

(75) Inventors: Wei Fan, New York, NY (US); Haixun Wang, Irvington, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 11/035,889

(22) Filed: Jan. 14, 2005

(65) Prior Publication Data
US 2006/0161575 A1    Jul. 20, 2006

(51) Int. Cl.
G06F 17/30    (2006.01)
G06F 17/00    (2006.01)

(52) U.S. Cl. .............................. 707/6; 707/3; 707/100
(58) Field of Classification Search ............... 707/3–6, 707/100, 103 R
See application file for complete search history.

(56) References Cited

U.S. PATENT DOCUMENTS

| | | | |
|---|---|---|---|
| 6,643,633 B2 * | 11/2003 | Chau et al. ............... | 707/1 |
| 6,804,677 B2 * | 10/2004 | Shadmon et al. ......... | 707/101 |
| 7,096,270 B2 * | 8/2006 | Abjanic et al. .......... | 709/229 |
| 7,171,404 B2 * | 1/2007 | Lindblad et al. ......... | 707/3 |
| 2002/0133497 A1 * | 9/2002 | Draper et al. ........... | 707/100 |
| 2004/0060007 A1 * | 3/2004 | Gottlob et al. .......... | 715/513 |
| 2004/0083209 A1 * | 4/2004 | Shin ....................... | 707/3 |

FOREIGN PATENT DOCUMENTS

WO    WO 2004/079510    *   9/2004

OTHER PUBLICATIONS

Meng et al. ("XSeq: An indexing Infrastructure for Tree Pattern Queries", Jun. 13-18, 2004, ACM, 2 pages).*
Praveen Rao et al. "PRIX:Indexing and querying XML using Prufer sequences", proceedings of the 20th international conference on data engineering, 2004, 12 pages.*
Shurug Al-Khalifa et al. "structural jins: A primitive for efficient XML query pattern matching", proceedings of the 18th international conference on data engineering, 2002, 12 pages.*
Yi Chen et al. "incremental mining of frequent XML query patterns", proceedings of the forth IEEE internatinal conference on Data mining, 2004 4 pages.*
J T Yao et al. "a fast tree pattern matching algorithm for XML query", proceedings of the IEEE/WIC/ACM internatinal conference on web intelligence, 2004, 7 pages.*

* cited by examiner

*Primary Examiner*—Srirama Channavajjala
(74) *Attorney, Agent, or Firm*—Ference & Associates LLC

(57) ABSTRACT

Sequence-based XML indexing aims at avoiding expensive join operations in query processing. It transforms structured XML data into sequences so that a structured query can be answered holistically through subsequence matching. Herein, there is addressed the problem of query equivalence with respect to this transformation, and thereis introduced a performance-oriented principle for sequencing tree structures. With query equivalence, XML queries can be performed through subsequence matching without join operations, post-processing, or other special handling for problems such as false alarms. There is identified a class of sequencing methods for this purpose, and there is presented a novel subsequence matching algorithm that observe query equivalence. Also introduced is a performance-oriented principle to guide the sequencing of tree structures. For any given XML dataset, the principle finds an optimal sequencing strategy according to its schema and its data distribution; there is thus presented herein a novel method that realizes this principle.

5 Claims, 13 Drawing Sheets

$\mathcal{D} : \langle P, PL, PLS, PL, \underline{PLB} \rangle$ (a)

False Alarm

$\mathcal{Q} : \langle P, PL, PLS, PLB \rangle$ (b)

Sequence Match

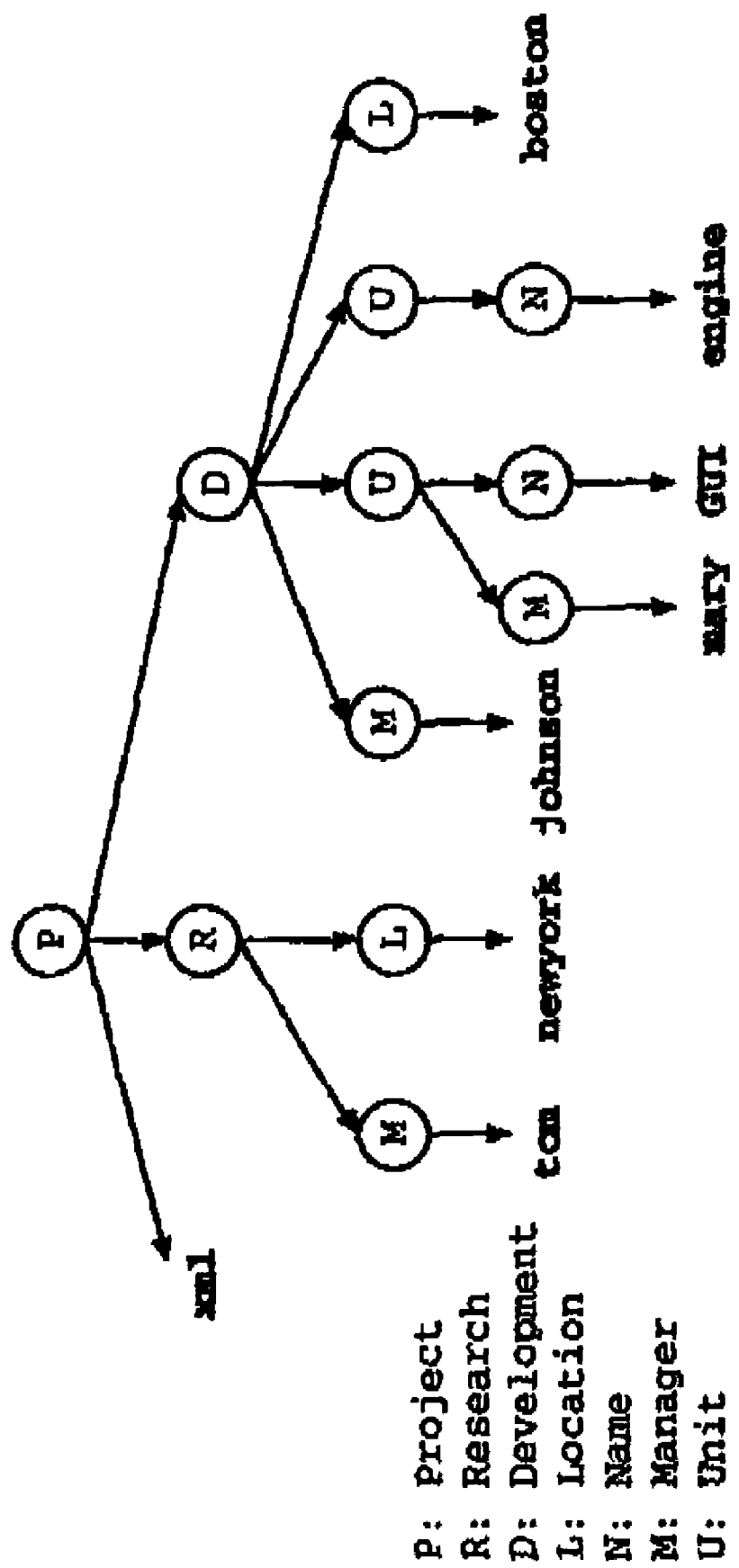
*Figure 1*: A Sample XML Document

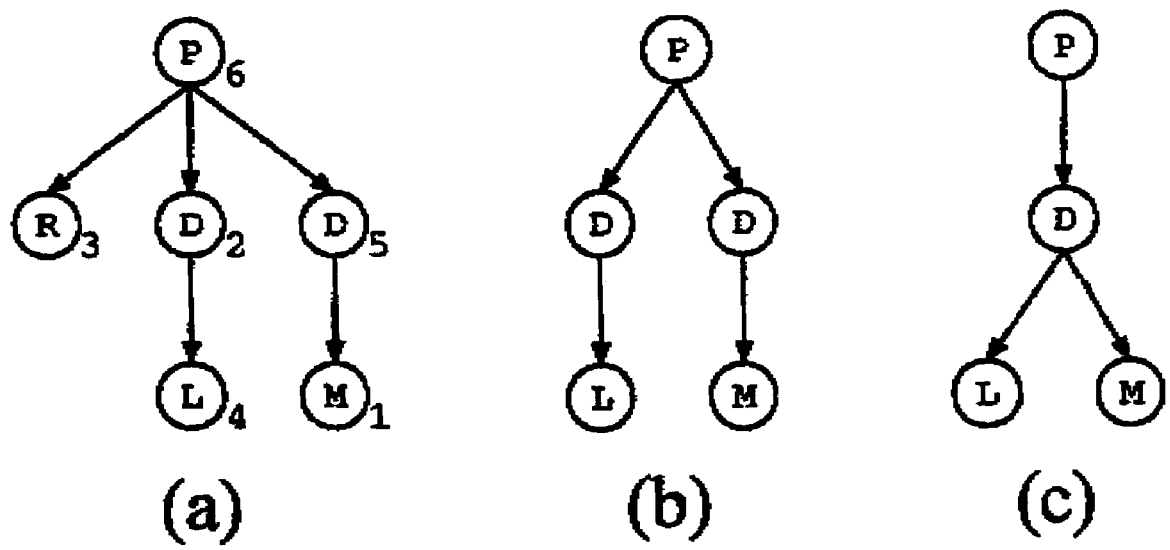
Figure 2: Sample Tree Structures

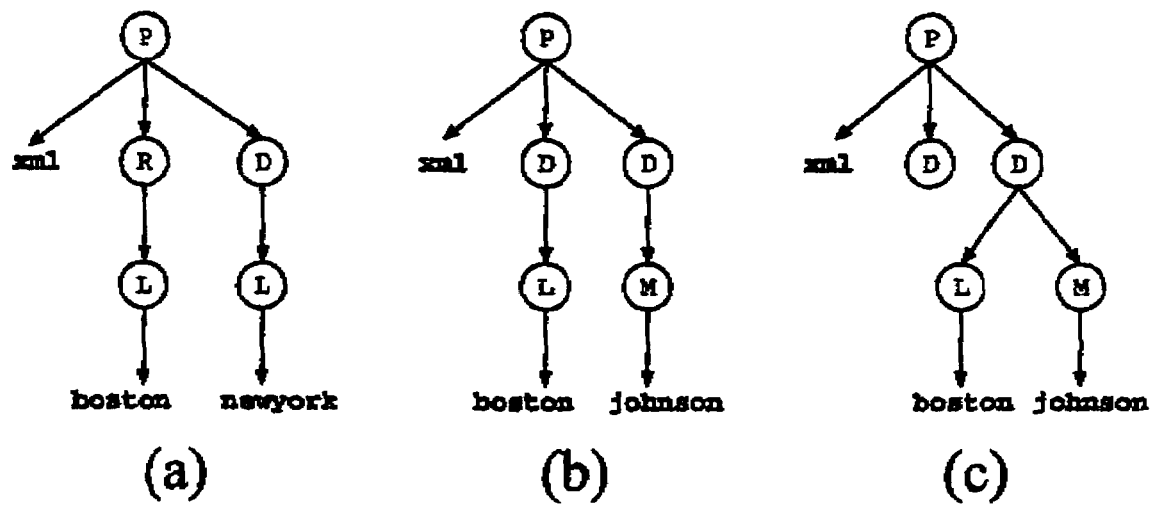
*Figure 3:* Tree Structure and Set Representation

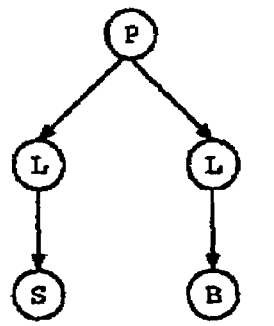 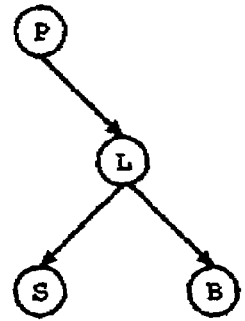
$\mathcal{D} : \langle P, PL, PLS, PL, \underline{PLB} \rangle$      $\mathcal{Q} : \langle \underline{P, PL, PLS, PLB} \rangle$
(a)      (b)
*Figure 4:* False Alarm

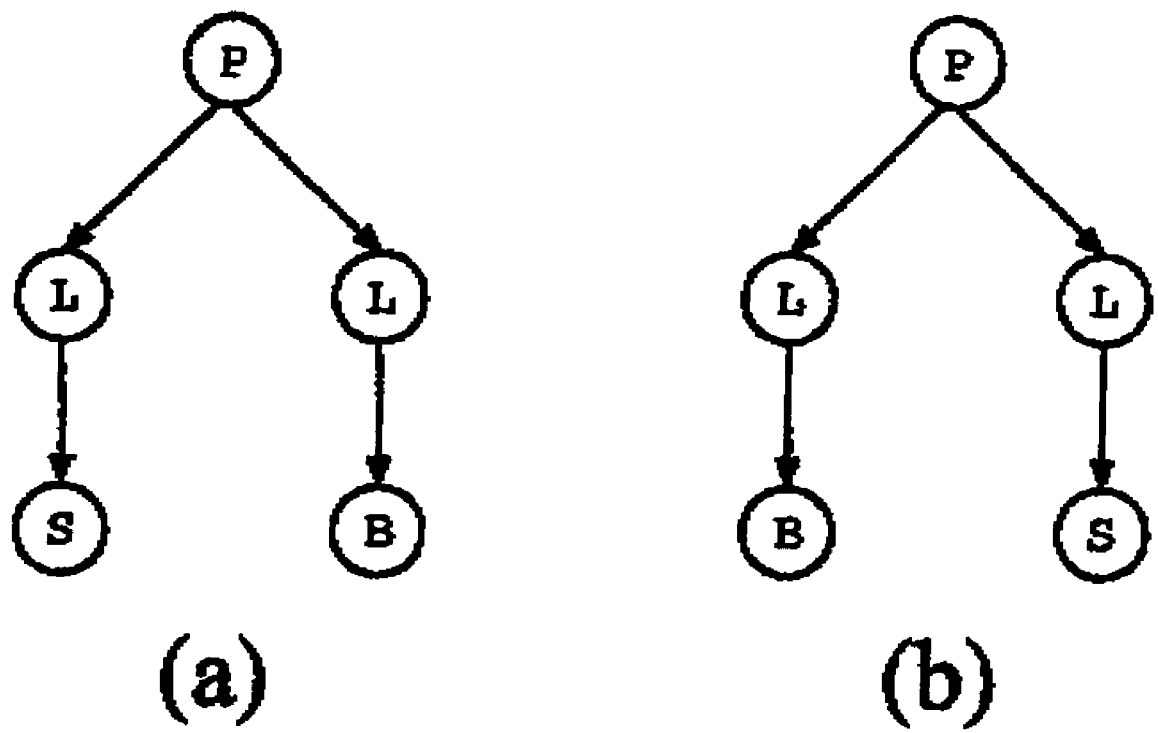
*Figure 5:* False Dismissal

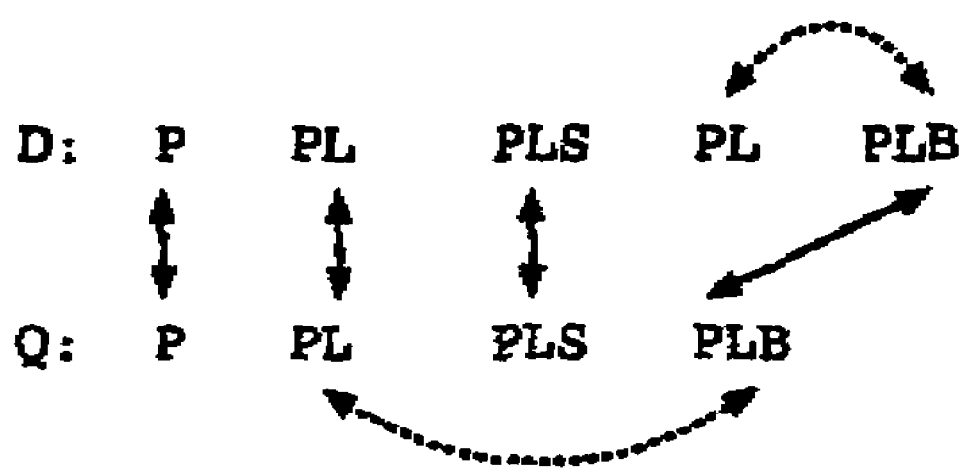
Figure 6: Sequence Match

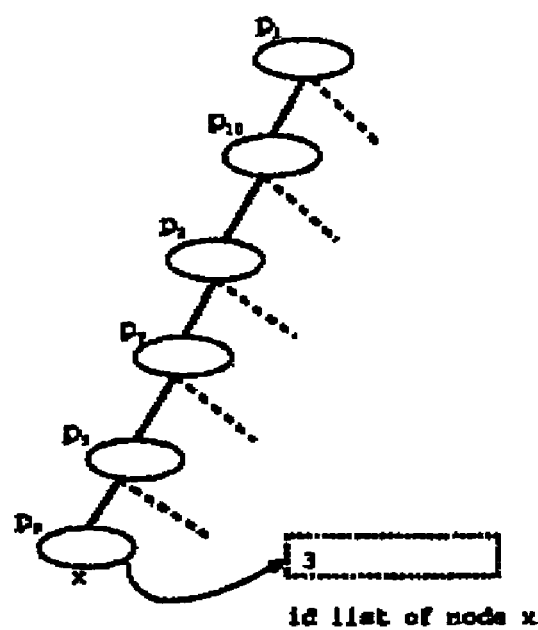
*Figure 7:* Insertion of a single sequence

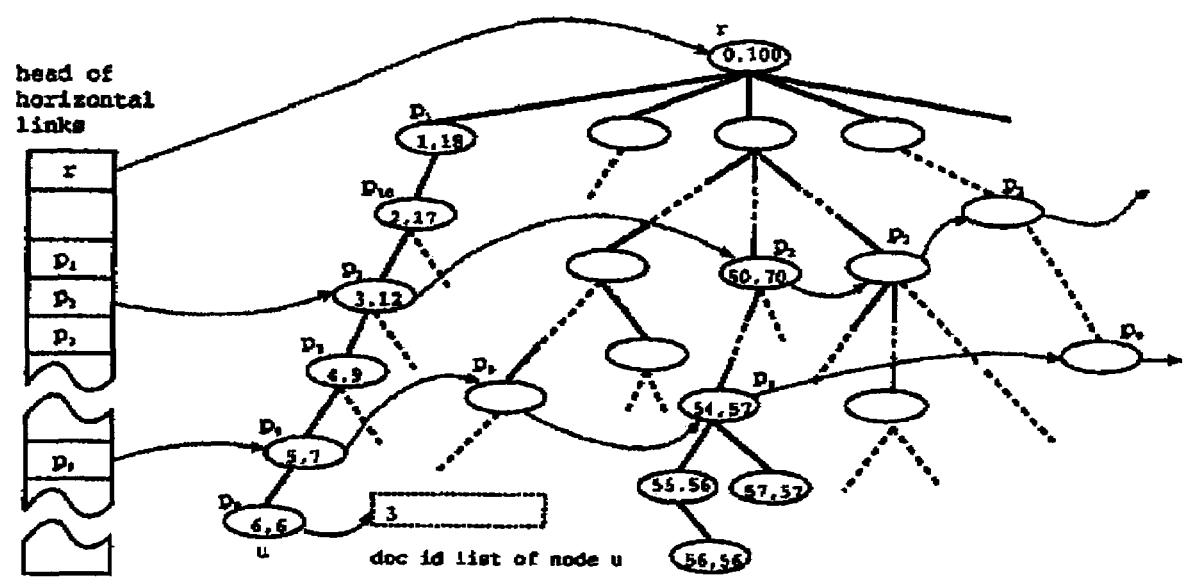
Figure 8: The index structure

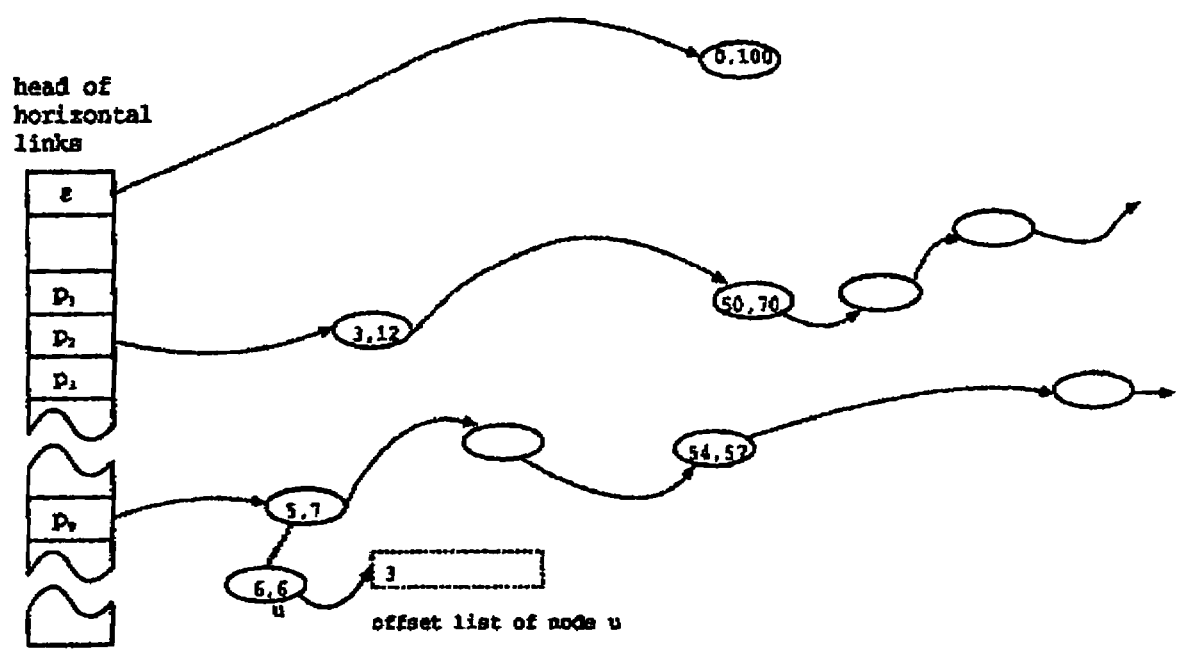
Figure 9: Index Structure

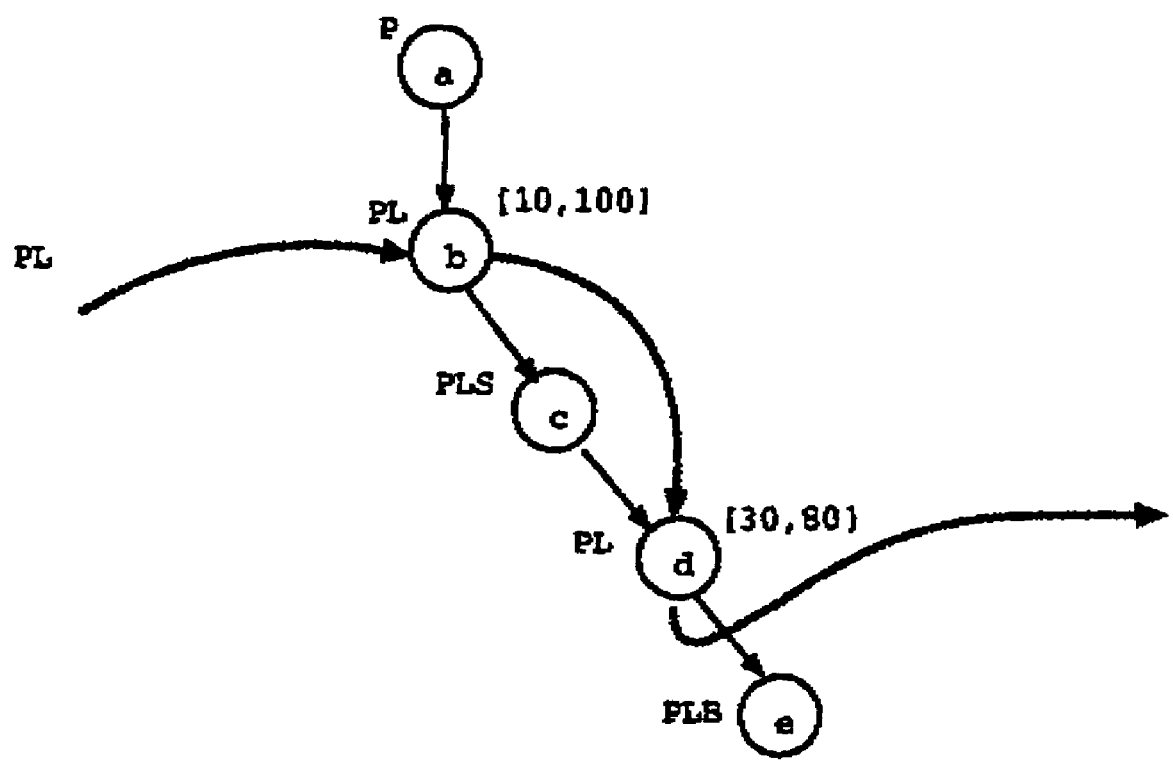
*Figure 10:* Identical Sibling Nodes

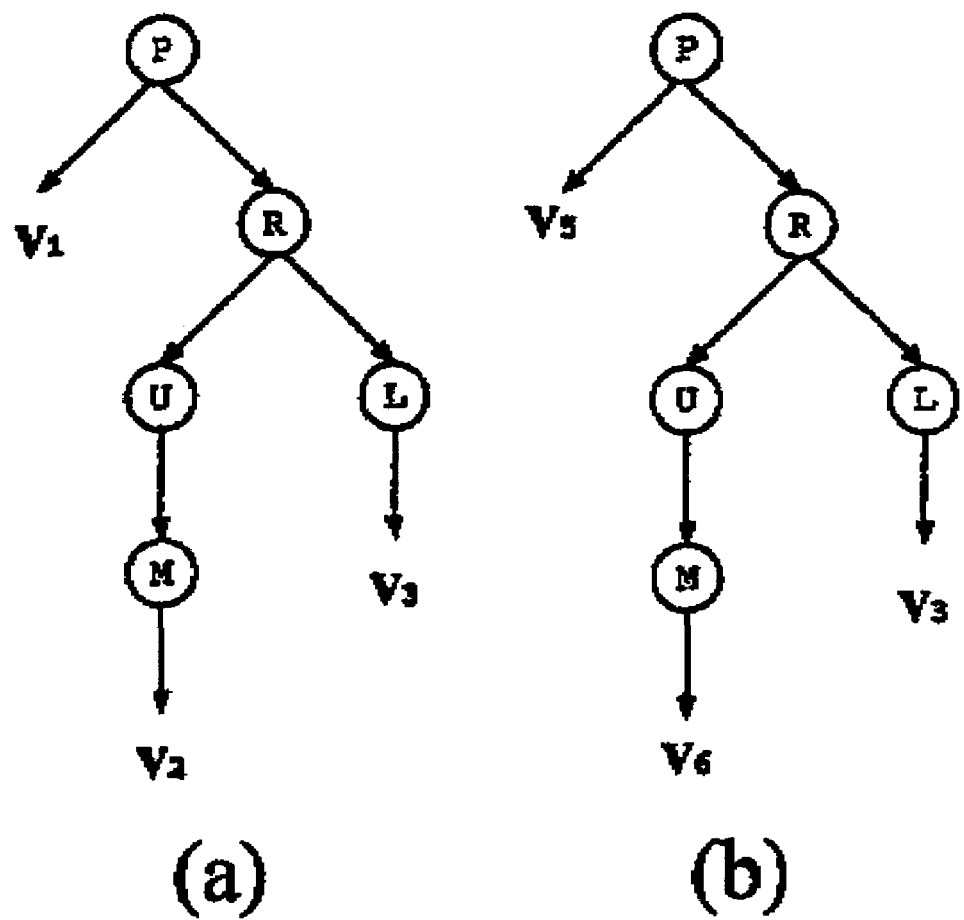
*Figure 11:* Sample XML Documents

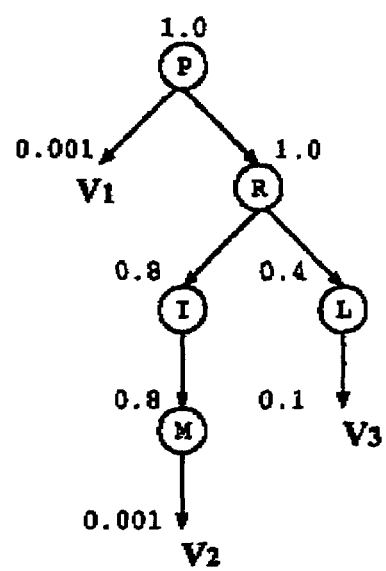
*Figure 12:* Existence probabilities given the parent

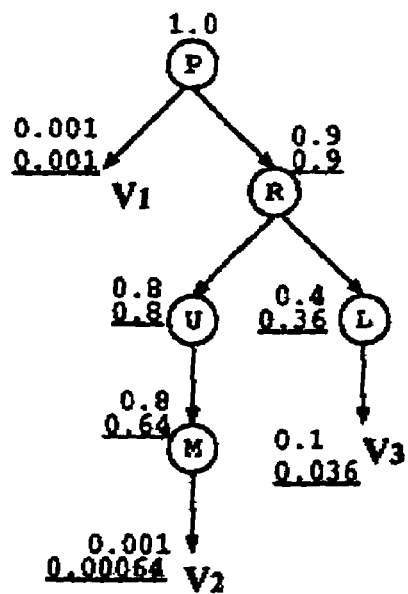
*Figure 13:* Existence probabilities given the root

SYSTEM AND METHOD FOR TREE STRUCTURE INDEXING THAT PROVIDES AT LEAST ONE CONSTRAINT SEQUENCE TO PRESERVE QUERY-EQUIVALENCE BETWEEN XML DOCUMENT STRUCTURE MATCH AND SUBSEQUENCE MATCH

FIELD OF THE INVENTION

The present invention relates generally to indexing XML by tree structures.

BACKGROUND OF THE INVENTION

XML is the standard language for representing and exchanging semi structured data in many commercial and scientific applications and much research has been undertaken on providing flexible indexing and query mechanisms to extract data from XML documents.

FIG. 1 is a sample XML document which describes a project hierarchy in the form of a tree structure. Due to the semi-structured nature of XML, XML documents are often modeled by tree hierarchies. For the same reason, the design of XML query languages also focuses on the ability to express complex structured queries. Such queries can also be modeled, in much the same way, by tree patterns. Thus, query answering becomes a process of finding embedded sub tree structures among a set of data tree structures.

Generally, the purpose of XML indexing is to provide efficient support for structured queries, which may contain values, wild-cards ('*' and '//'), tree patterns, etc. However, in most indexing solutions, the tree pattern is not a first class citizen or, the most basic query unit. As a result, structured queries cannot be handled directly, and the most commonly supported query interface is instead:

Simple Paths ⇒P (Node Ids)

where P(S) stands for the power set of S.

That is, given a path, the index returns a set of nodes that represent such a path. Some index methods extend the above interface to support relative paths that start with a '*' or "//" at the cost of building a much larger index.

Tree patterns are not the most basic query unit because one normally cannot afford to maintain a separate index entry for each possible tree pattern, especially when they contain attribute values, wildcards '*' or '//'. Instead, one normally disassembles a tree pattern into a set of simple path queries. Then, one uses join operations to merge their results to answer the original query. To avoid expensive join operations for queries that occur frequently, some index methods create special index entries for a limited set of path templates.

In view of the foregoing, it has been found that conventional approaches to tree structure indexing via XML suffer from shortcomings and inefficiencies that warrant improvement. A need has accordingly been recognized in connection with effecting such improvement.

SUMMARY OF THE INVENTION

In accordance with at least one presently preferred embodiment of the present invention, sequence-based XML indexing is broadly contemplated. Sequence-based XML indexing represents a major departure from previous XML indexing approaches in that it supports a more general query interface:

Tree Pattern ⇒P (Doc Ids)

That is, given a tree pattern, the index returns a set of XML documents/records that contain such a pattern. Instead of disassembling a structured query into multiple sub queries, the tree structure is used as the basic query unit.

To do this, it preferably transforms both XML data and queries into sequences and answers XML queries through subsequence matching. Motivation can be found in that, if one can represent an arbitrary tree structure by a sequence and demonstrate the equivalence between a structure match and a sequence match, then one can answer structured queries holistically, thus avoiding expensive join operations in query processing.

In summary, one aspect of the invention provides an apparatus for providing tree structure indexing, said apparatus comprising: a querying arrangement; and an indexing arrangement; said querying arrangement being adapted to query based on a tree pattern; said indexing arrangement being adapted to provide a set of XML elements containing a pattern similar to the queried tree pattern.

Another aspect of the invention provides a method of providing tree structure indexing, said method comprising the steps of: issuing a query; and providing indexing responsive to an issued query; said querying step comprising issuing a query based on a tree pattern; said indexing step comprising providing a set of XML elements containing a pattern similar to the queried tree pattern.

Furthermore, an additional aspect of the invention provides a program storage device readable by machine, tangibly embodying a program of instructions executable by the machine to perform method steps for providing tree structure indexing, said method comprising the steps of: issuing a query; and providing indexing responsive to an issued query; said querying step comprising issuing a query based on a tree pattern; said indexing step comprising providing a set of XML elements containing a pattern similar to the queried tree pattern.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 schematically illustrates a sample XML document.
FIG. 2 schematically illustrates sample tree structures.
FIG. 3 schematically illustrates tree structure and set representation.
FIG. 4 schematically illustrates false alarm scenarios.
FIG. 5 schematically illustrates false dismissal scenarios.
FIG. 6 schematically illustrates sequence matching.
FIG. 7 schematically illustrates the insertion of a single sequence.
FIG. 8 schematically illustrates an index structure.
FIG. 9 schematically illustrates an index structure.
FIG. 10 schematically illustrates identical sibling nodes.
FIG. 11 schematically illustrates sample XML documents.
FIG. 12 schematically illustrates existence probabilities among some nodes, given a parent.
FIG. 13 schematically illustrates existence probabilities among some nodes, given a root.

DESCRIPTION OF THE PREFERRED EMBODIMENTS

Tables and algorithms referred to herebelow are provided at the close of the instant disclosure.

By way of general introduction, sequence-based approaches such as those contemplated herein open up many new research issues. Previous works singled out ad hoc sequencing methods such as the depth-first traversal and the Prüfer codes (for a discussion on this and Prüfer sequences, see H. Prüfer. Neuer Beweis eines Satzes über Permutationen. Arch. Math. Phys. 27:142-144, 1918). On the other hand, two questions (among others) are asked herein:

1. What are the sequencing methods that preserve the query equivalence between structure and sequence match?
2. Given a dataset, which sequencing method shall we use in order to maximize the performance of indexing and querying?

The above challenges are built upon herein in at least three aspects: i) the representation of tree structures, ii) the query equivalence, and iii) the performance-oriented sequencing principle. These are briefly outlined herebelow.

A sequence-based approach starts with a valid sequential representation of tree structures. The ViST approach, for example, represents a tree node by a pair (X,Y), where X is the label of the node, and Y its path in the tree. Then, a tree structure can be represented by its depth-first traversal sequence. For instance, the tree structure in FIG. 2(a) is encoded by the following sequence:

$$\langle (P,\epsilon),(R,P),(D,P),(L,PD),(D,P),(M,PD) \rangle \quad (1)$$

The Prüffercode is a more succinct tree encoding method. Consider a tree of n nodes labeled arbitrarily from 0 to n−1. To encode it by a Prüfer sequence, we repeatedly delete the leaf node that has the smallest label and append the label of its parent to the sequence. The Prüfer sequence for the tree in FIG. 2(a) is ⟨5,6,2,6,6⟩.

One important implication of sequencing is the query equivalence. Assume we have transformed both XML data and queries to sequences by a particular method, and we answer XML queries by (non-contiguous) subsequence matching. Is a subsequence match always tantamount to a structure match?

In accordance with a preferred embodiment of the present invention, such equivalence represents a significant foundation of sequence-based XML indexing. For certain sequencing methods, the equivalence seems to be clear. For instance, FIG. 2(b) is a sub structure in FIG. 2(a), and the depth-first sequence of this embedded structure, ⟨(P,ϵ),(D,P),(L,PD),(M, PD) ⟩ is a non-contiguous subsequence of (1). This indicates that we can answer structured query through subsequence matching.

However, query equivalence between a structure match and a subsequence match has never been formally investigated. There are exceptions to this equivalence even for depth-first sequences. For instance, ⟨(P,ϵ),(D,P),(L,PD),(M, PD) ⟩ is the depth-first traversal sequence for FIG. 2(c), and it is a non-contiguous subsequence of (1). But apparently, FIG. 2(c) is not a sub structure of FIG. 2(a). Thus, this match is a false alarm.

The false alarm problem described above is not unique to depth-first traversal. It is shared by all most all sequencing methods, including Prüfer. Current approaches get around this nonequivalence problem by resorting to join operations or document by document post-processing, both of which are very time consuming.

Thus, challenges here are to i) identify a class of sequencing methods that preserve query equivalence, and ii) devise an efficient algorithm that performs subsequence match under such equivalence.

The challenges aforementioned focus on equivalences: i) the equivalence between a tree structure and a sequence, and ii) the equivalence between a structure match and a subsequence match.

However, representation and query equivalence is just a prerequisite for sequence-based XML indexing. A very significant challenge is to find the best sequencing method, that is, to support performance-oriented sequencing.

Sequencing has great implications to query performance. As we will demonstrate in Section 5, the performance of an index structure for a set of sequences is very specific to the distribution of the sequences, or more specifically, to the extent of sharing among the sequences. The extent of sharing is determined by the sequencing method as well as the data distribution of the original dataset of tree structures. Thus, instead of looking for a sequencing method that outperforms any other method for any dataset, we shall focus on the following challenge: given certain information (e.g. the schema and/or other data distribution statistics) of an XML dataset, how do we find a sequencing method that maximizes the performance of indexing and querying?

Turning now to various details regarding a general approach as broadly contemplated in accordance with at least one presently preferred embodiment of the present invention, let g be a sequencing method which maps a tree structure d to a sequence g(d). For a dataset D, let $g(D)=\{g(d)|d \in D\}$. A problem is found in the following:

First, find a class of sequencing methods $g_i, \ldots, g_n$ such that each $g_i$ preserves the query equivalence between a structure match and a subsequence match.

Second, for a given dataset D, find one sequencing method g from $g_i, \ldots, g_n$ so that the index structure built on g(D) provides the best performance in terms of time and space complexity.

We solve the above problems based on a systematic study of sequence-based XML indexing. As such, we introduce query-equivalent sequencing, performance-oriented sequencing and algorithms for sequencing, indexing and querying.

By way of query-equivalent sequencing, we identify a class of sequencing methods that preserve query equivalence, so that structured queries can be answered through subsequence matching without joint operations or document-by-document post-processing, and problems such as false alarms can be avoided.

By way of principle-oriented sequencing, it can be noted that a principle of sequencing in accordance with an embodiment of the present invention is found in maximizing the performance of XML indexing and querying. We show how this principle can be realized by taking into consideration the distribution of the XML data during the process of sequencing.

Finally, we propose at present algorithms that transform XML data to valid sequences for high-performance indexing and querying, and we show how the index structure overcomes the false alarm problem.

Most tree sequencing methods can be regarded as having two parts: i) the encoding of the tree nodes, and ii) the order of the encoded nodes in the sequence. Together, they must convey enough information so that we can reconstruct the tree structure from the sequence. In this section, we study different ways to represent or encode a tree structure by a sequence.

We designate each element and attribute name in an XML document by a designator. For instance, in FIG. 1, P, R, D, L, . . . are the designators.

For attribute values, we have two options. One is from ViST, which represent each value by a single designator derived by a hash function. For instance, assuming $$v_0=h(\text{'xml'}), v_1=h(\text{'boston'}), v_2=h(\text{'newyork'}),$$

we use $v_1$ to designate 'boston', $v_2$ 'newyork', etc. The second option is to represent a value by a text sequence, for instance, 'boston' by b,o,s,t,o,n, which is similar to Index Fabric.

Thus, a simple path/Project/Research[Location=boston] can be represented by:

⟨P,R,L,$v_1$⟩ or ⟨P,R,L,b,o,s,t,o,n⟩

The first representation treats each value as an atomic item and the second representation will allow subsequence matching inside the attribute values. For presentation simplicity, we use the first option, but the concepts and algorithms described in this paper can be applied to the second option with easy adaptation.

As we will show further below, in order to achieve the best performance, sequencing shall reflect the data distribution of the XML dataset. In other words, the order of the nodes in the sequence cannot be solely bound by the tree structure it represents. Our approach is to include as much structural information as possible in node encoding, then we can relieve the burden on sequencing and achieve flexibility.

We encode each node n in the tree by the path leading from the root node to n. For instance, in FIG. 3(a), the nodes on the middle branch are encoded by P, PR, PRL, and PRLv1 respectively. We also use ⊂ to denote the prefix relationship among the paths. This representation is similar to that of ViST, but instead of using a pair, we use paths only.

The path-encoded nodes have already included much structural information, to the extent that the tree structure in FIG. 3(a) can be derived directly from the encoded nodes:

{P,P$v_0$,PR,PD,PRL,PDL,PRL$v_1$,PDL$v_2$}.

Here, the order of the encoded nodes is irrelevant. In other words, an arbitrary sequence of the nodes can represent the tree structure. We have achieved the maximum flexibility.

However, when there are identical sibling nodes under a parent node, set representation 3(c), under node P, there are two identical sibling nodes D, and the two structures have the same multi-set representation:

{P,P$v_0$,PD,PD,PDL,PDM,PDL$v_1$,PDM$v_3$}

This means, with the presence of identical sibling nodes, path-based node encoding alone is insufficient. We must resort to sequencing to supplement the missing information.

The order of the nodes in a sequence can supply the structural information missing in the set representation.

For instance, one possibility is to represent the tree structures of FIGS. 3(b) and 3(c) by depth-first traversal sequences, as shown in Table 1.

It is easy to see that the depth-first traversal sequences represent unique tree structures. Depth-first sequencing is certainly not the only choice, many ad hoc sequencing methods including the Prüfer codes work as well.

Nevertheless, we do not want to confine ourselves to a particular way of ordering the nodes. Because, besides encoding the structure, sequencing shall play a more important role: it shall order nodes based on the distribution of the XML data, so that we can achieve the best index and query performance (see further below).

Given a tree structure, ad hoc sequencing methods such as depth-first traversal and Prüffercodes lead to unique orderings of the tree nodes. However, unique ordering is far more restrictive than necessary, and it is in conflict with our intention to support performance-oriented sequencing, for we are interested in finding a many-to-one relationship between sequences and tree structures.

The reason we cannot use arbitrary sequencing to represent the tree structures in FIG. 3(b) and FIG. 3(c) is because of the two identical sibling nodes encoded as PD. They cause ambiguity when we try to determine the ancestor-descendant relationships among the sequenced nodes.

If we can introduce a constraint that eliminates such ambiguity, we will be able to map any sequence of path-encoded nodes into a unique tree structure. Within the constraint, we can still have the freedom to order the nodes arbitrarily. Thus, a tree structure will have multiple sequential representations. Such a constraint actually defines a sequencing method.

Let T=⟨$p_1$, . . . , $p_n$⟩ be a sequence of path-encoded nodes. We define constraint as follows:

A constraint is a boolean function $f(\cdot,\cdot)$ that satisfies the following condition: $\forall p_j \in T$ and $\forall t \subset p_j$, there exists one and only one $p_i \in T$ such that $f(p_i, p_j)$=true and $p_i$=t.

Intuitively, $f(p_i,p_j)$ embodies the ancestor-descendant relationship between $p_i$ and $p_j$ that is, $f(p_i,p_j)$ evaluates to true if $p_i$ is an ancestor of $p_j$. The definition of constraint ensures that, $\forall p_j \in T$, i) each and every of $p_j$'s ancestor exists; and ii) none of its ancestors can have the same path encoding (no ambiguity).

For tree structures such as the one in FIG. 3(a) that contain no identical sibling nodes we can define the following constraint:

$$f_1(p_i,p_j) \equiv p_i \subset p_j \quad (2)$$

Function $f_1$ is a constraint because each $p_i$ is unique (the tree structure does not have identical sibling nodes). Since the definition of $f_1$ does not rely on the relative positions of $p_i$ and $p_j$ in the sequence, it does not place any constraint on the ordering, which means nodes can form arbitrary sequences.

When identical sibling nodes are present, we need a constraint that can eliminate ambiguity. The forward prefix defined below is one way to eliminate ambiguity. Intuitively, among the ambiguous ancestors of x, we choose the one that appears earlier than x in the sequence, and if none or more than one such node exists, we choose the one that is closest to x.

Forward Prefix: Let ⟨$p_1$, . . . , $p_n$⟩ be a sequence of path-encoded nodes. We say $p_k \subset p_i$ is a forward prefix of $p_i$ if $\forall p_j = p_k$, i<k<j and there does not exist $p_j = p_k$, k<j<i.

For example, in sequence (P,<u>PD</u>,PDL,PDL$v_1$, PD,PDM,PDM$v_3$⟩, the second PD is a forward prefix of PDM$v_3$ while the first PD is not. Thus, the new constraint can be defined as:

$$f_2(p_i,p_j) \equiv p_i \text{ is } p_j\text{'s forward prefix} \quad (3)$$

It is clear that i) $f_2$ introduces extra constraints to $f_1$, and ii) $f_2$ relies on the order of the path-encoded nodes to determine the ancestor-descendant relationship among them.

TABLE 2

Constraint sequences of FIG. 3 (c)

⟨P, P$v_0$, PD, PD, PDL, PDL$v_1$, PDM, PBM$v_3$⟩
⟨P, PD, P$v_0$, PD, PDM, PBM$v_3$, PDL, PDL$v_1$⟩
⟨P, PD, PDL, P$v_0$, PDL$v_1$, PDM, PBM$v_3$, PD⟩
⟨P, PD, PDM, PBM$v_3$, P$v_0$, PDL, PDL$v_1$, PD⟩
⟨P, PD, PDM, PBM$v_3$, PDL, P$v_0$, PDL$v_1$, PD⟩

Despite the constraint, given a tree structure, we can still represent it by more than one sequence, and we can reconstruct the tree structure from any of them. The tree structure in FIG. 3(c) and its sequence representations in Table 2 are such an example. We call such sequences constraint sequences.

Theorem 1. A constraint sequence maps to a unique tree structure.

Proof. (Sketch) In a constraint sequence, x is an ancestor to y only if $f(x,y)$ is true. Since the constraint guarantees that for any y only one of the identical sibling nodes can be y's ancestor, the position of any node in the tree is uniquely defined.

How do we sequence a tree structure into multiple sequences that satisfy a constraint $f$? What are the implications of choosing different constraints?

Constraint sequencing is controlled by i) a constraint $f$, and ii) a user strategy g. That is, the generated sequences must satisfy $f$, but within the constraint, we can use a user-provided strategy g to order the nodes. For constraint $f_1$, sequencing is totally controlled by user strategy g. For constraint $f_2$, let us consider the following procedure.

First, we select the root node. Then, we repeatedly invoke user strategy g to select a node whose parent node has already been selected. However, if a selected node x has identical sibling nodes, we must not select any of its identical siblings until all the descendents of x have been selected.

The above simple procedure actually enforces a stronger constraint than $f_2$, because in the generated sequences, an ancestor always appear earlier than its descendents. As discussed herebelow, following the performance-oriented sequencing principle, our strategy g selects nodes based on their occurrence probabilities. Since a parent node always has a larger occurrence probability than its child nodes, we will always have x's ancestors appearing before x. Thus, the above simple procedure will suffice.

As we know, $f_x$ places an constraint on the order of the nodes in the sequence to handle identical sibling nodes. But certainly $f_2$ is not the only possible constraint for this situation. When deciding which node among a set of identical sibling nodes should be x's ancestor, the forward prefix rule favors the one that appears earlier than x and closer to x. We can of course using other criteria.

Our focus, however, is whether the constraint leaves enough freedom for applying a user strategy g. Compared with ad hoc sequencing methods (e.g., depth-first traversal and Prüffercodes), constraint sequencing has the potential to offer this flexibility which will make a big difference to the performance of XML indexing and querying.

The disclosure now turns to a discussion of query equivalence based on constraint sequences. Herebelow, we introduce a subsequence matching algorithm that ensure query equivalence between structure match and subsequence match.

Before the "best" user strategy is introduced herebelow, let us use depth-first traversal as our strategy. This is only for illustration purposes, for the issues discussed in this section apply to any constraint and any user strategy.

We can represent a tree structure by constraint sequences. For example, the tree structure in FIG. 1 can be represented by the following sequence that satisfies constraint $f_2$.

$\langle \underline{P},Pv_1,\underline{PR},PRM,PRMv_2,$
$\underline{PRL,PRLv_3,PD},PDM,PDMv_4,PDU,PDUM,PDUMv_5,$
$PDUN,PDUNv_6,PDU,PDUNv_7,\underline{PDL,PDLv_8}\rangle$ (4)

In the same spirit, we can represent XML structural queries by constraint sequences. For instance, the XPath query /Project[Research[Loc=newyork]]/Develop
 [Loc=boston]

can be represented by constraint sequence:

$\langle P,PR,PRL,PRLv_3,PD<PDL<PDLv_8\rangle$

It is easy to see that the above query sequence is a non-continuous subsequence (the underlined part) of the document sequence in Eq (4). Moreover, queries with wildcard ("*" or "//") can also be converted to sequences. For instance, we can represent XPath query /Project/*[Loc=$v_8$] by constraint sequence $\langle P,P*,P*L,P*Lv_8\rangle hP,P*,P*L,P*Lv8i$, which is also a non-contiguous subsequence in (4) once "*" is instantialized to symbol D.

However, due to the existence of identical sibling nodes, XML structure match is not equivalent to the naïve subsequence match described above.

Identical sibling nodes under a parent node causes problem not only to data representation but also to queries.

FIGS. 4(a) and 4(b) are apparently different tree structures, however, there is a non-contiguous subsequence match between their constraint sequence representations, that is, $Q \subseteq D$. That is, naïve subsequence matching triggers false alarms in answering structural queries. This problem is not unique to constraint sequencing. However, previous approaches handle this problem through expensive join operations or document-by-document post-processing.

The second problem, false dismissal, is due to tree isomorphism. In FIG. 5, we show the same XML structures in two different forms.

However, the two forms can have different sequence representations. For instance, their constraint sequences (based on $f_2$ and the depth-first traversal strategy) can be the following:

$\langle P,PL,PLS,PL,PLB\rangle$ and $\langle P,PL,PLB,PL,PLS\rangle$

Thus, if the data sequence is in one form and the query sequence is in the other, we will have the false dismissal problem.

The false dismissal problem is easy to avoid. Given a query structure, we regard each of its isomorphism structures as a different query, and union the results of these queries. The false alarm problem is more difficult, and previous methods cannot handle it without using expensive join operations or post-processing. In contrast, constraint sequences can handle this problem directly.

Let us consider the example in FIG. 4. We represent the match between D and Q by solid arrow lines in FIG. 6.

Let function m(•) maps an element in Q to its matched element in D. We define the concept of constraint match as follows:

Given a match m(•) between sequences Q and D, which are based on constraint $f$, it is a constraint match if the following criteria are satisfied:
 1. m(a)=b ⇒ a=b
 2. $f(a,b) \Leftrightarrow f(m(a),m(b))$ It is easy to see that naïve subsequence match only guarantees the 1st criterion, that is, m(a)=b ⇒ a=b=b, and leaves the 2nd criterion unchecked. For instance, although there is a sequence match in FIG. 6, the 2nd criterion is violated there: as indicated by the arrows with dotted lines, element PL is an ancestor of element PLB in Q, however, m(PL) is not an ancestor of m(PLB) in D.

Note that if no identical sibling nodes exist in the documents, then the 2nd condition is implied by the 1st. This is so because, without identical sibling nodes, the relative positions of two nodes are uniquely defined by their paths.

Theorem 2. Constraint match preserves query equivalence.

Proof. By Theorem 1 and Definition 3.

However, Theorem 2 does not apply to isomorphic trees. This is not critical because false dismissals caused by the isomorphic tree problem can be handled by simply asking multiple queries and combining their results—there is no need to use expensive join operations or document-by-document post-processing.

The disclosure now turns to a presentation of an algorithm for indexing and querying XML data. The query algorithm performs constraint subsequence matching, which preserves query equivalence between structure match and subsequence match.

The algorithm for Index construction takes the following three steps.

SEQUENCE INSERTION: We represent each XML document by a constraint sequence, and insert the sequence into a trie-like tree structure. For instance, suppose we have a document with the following constraint sequence representation:

$$\langle p_1, p_{10}, p_2, p_7, p_9, p_8 \rangle$$

FIG. 7 shows the tree structure corresponding to the insertion of the above sequence. Supposing the insertion ends up at node x, we append the id of this document into the (document) id list of x. If we are indexing static data, instead of inserting sequences one by one, we can "bulk load" the index by sorting the sequences first to improve-performance.

TREE LABELING: In the second step, we label the nodes of the tree. Each node n is labeled by a pair of integers $(n^\leftarrow, n^\rightarrow)$ where $n^\leftarrow$ is n's serial number (derived from a depth-first traversal of the index tree, which assigns 0 to the root node), and $n^\rightarrow$ is the largest serial number of n's descendents. This labeling scheme is used in many XML indexing algorithms. Given the labels of two nodes x and y, we know x is y's descendent if $x^\leftarrow \in (y^\leftarrow, y^\rightarrow]$. In contrast to previous algorithms using the same numbering scheme, we apply the labeling scheme on a trie-like structure built upon the constraint sequences derived from the XML documents, instead of on the original XML document trees.

PATH LINKING: In the third step, we create horizontal path links for each unique path that appears in the sequences. Each path link includes labels of tree nodes represented by the same path-encoding. FIG. 8 shows the index structure, which has the headers of the linked list on the left hand side. If we do not consider the identical sibling issue (which is discussed in detail in the next subsection), we shall find that the labels of the nodes in a single link are in ascending order of their serial number $n^\leftarrow$. The linked lists in FIG. 8 are just for presentation purpose; they can easily be implemented by a more efficient structure that supports binary search.

Turning to query XML by subsequence matching, first, we demonstrate naïve subsequence matching using the index structure. On top of that, we describe constraint subsequence matching, which preserves query equivalence between structure match and subsequence match.

We perform naïve subsequence matching using the index shown in FIG. 8. Suppose we have the following query:

$$\langle p_0, p_2, p_9, p_8 \rangle$$

It turns out that in order to answer such a query, we can safely ignore the tree structure and focus on the path links (FIG. 9) only. The query proceeds as follows. We start with the first element, $p_0$, in the query sequence. Through the path links, we find that it corresponds to one label, which represents a range of [0, 100]. Then, we check the second element, $p_2$. It corresponds to a list of labels, but we are only interested in those within the range of [0, 100], since only those nodes are descendents of $p_0$. So we perform an efficient binary search [0, 100] on the link for $p_2$, thanks to the fact that the labels there are in ascending order. We repeat the above process until the end of the query sequence. Suppose one of the nodes we finally reach is x. Then the id of the documents that satisfy the query are in the id lists of x's descendents. This naïve subsequence matching process is similar to that used in ViST.

Turning to constraint subsequence matching, as we have mentioned, XML query is more than naïve subsequence matching: there is the false alarm problem caused by identical sibling nodes.

Here, we show how constraint subsequence matching works. When there are no identical sibling nodes, the labels in the path links are in strict ascending order. This is no longer true when identical sibling nodes are involved. In FIG. 10, we insert the data sequence D with two PL elements into an index tree. In the tree, the first PL is an S-ancestor of the second, which means the range of the first PL covers that of the second. However, since they are both PL, they reside in the path link of PL, which is also shown in FIG. 10. Assume we have matched the first 3 elements in query sequence Q to nodes b, d and e in FIG. 10, and we have reached node e that matches PLB. Does the 2nd criterion in Definition 3 hold for this match?

The answer is it does not. In query sequence Q, PL is an ancestor of PLB, that is, $f(PL, PLB) = true$, where $f$ is the constraint. However, in FIG. 10, node b cannot be an ancestor of node e because of the existence of node d, that is, $f(b,e) = false$. In other words, assuming node b and d has range [10, 100] and [30, 80] respectively, the descendants of b cannot have labels inside [30, 80]. Thus, we cannot match PLB to node e.

More formally, let $Q = \langle \ldots p_x \ldots p_y \ldots \rangle$ be a query sequence, where $p_x$ is a forward prefix of $p_y$, and let the following be the path link for $p_x$:

$$\ldots, [u^\leftarrow, u^\rightarrow], \underbrace{[v_1^\leftarrow, v_1^\rightarrow], \ldots, [v_k^\leftarrow, v_k^\rightarrow]}_{identical-sibling-nodes}, [w^\leftarrow, w^\rightarrow], \ldots \quad (5)$$

In the path link, $[v_1^\leftarrow, v_1^\rightarrow], \ldots [v_k^\leftarrow, v_k^\rightarrow]$ represents a series of identical sibling nodes such that $[v_1^\leftarrow, v_1^\rightarrow] \supseteq [v_j^\leftarrow, v_j^\rightarrow], 1 \leq j \leq k$. We define the concept of sibling-cover as follows:

Assume $p_x$ matches node $v_i$ and $p_y$ matches node y. Node y is sibling-covered by $v_i$ if $[y^\leftarrow, y^\rightarrow] \subseteq [v_{i+1}^\leftarrow, v_{i+1}^\rightarrow]$.

During the matching process, it is easy to check if the current node is sibling-covered by a previously matched node. All we need to do is storing each previously matched node who has identical siblings. When we try to match a new node, we check previously matched nodes that are its potential ancestors, and make sure the range of the new node is not inside any of the sibling range of the potential ancestor. Theorem 3 shows the correctness of this process.

Theorem 3.

Let query $\langle q_1, \ldots, q_k \rangle$ match $\langle v_i, \ldots, v_k \rangle$ in the index tree. The match is valid if no $v_j$, $j=1, \ldots, k$ is sibling-covered.

Proof. We only need to prove the 2nd criterion of Definition 3 is satisfied, i.e., $f(q_i, q_j) \Leftrightarrow f(v_i, v_j)$. Assume $v_i$ is not an ancestor to $v_j$, then $v_i$ is not $v_j$'s forward prefix. Let v be $v_j$'s forward prefix. Then $v_i$ and v must be in the same path link. Since v is $v_j$'s closest prefix node, we have $[v_i^\leftarrow, v_i^\rightarrow] \supseteq [v^\leftarrow, v^\rightarrow] \supseteq [v_j^\leftarrow, v_j^\rightarrow]$, which means $v_j$ is sibling-covered by $v_i$.

Algorithm 1 outlines the procedure that performs XML query through constraint subsequence matching, and it takes care of the problem of identical sibling nodes.

Turning to performance-oriented sequencing, we have transformed XML data into constraint sequences and answered XML queries by a special subsequence matching algorithm that preserves query equivalence.

In addition to preserving query equivalence, constraint sequences allow a user defined strategy g in sequencing. In this section, we study the impact of different strategies on the performance of indexing and querying XML, and we show how to choose a strategy to maximize the performance.

Many sequencing strategies are available, for instance, depth-first traversal, breadth-first traversal, or even Prüffer-sequencing. Then, what is the principle in choosing from these strategies? We argue that the principle should be based on whether a particular sequencing method can maximize the performance of XML indexing and querying.

To understand the principle, we must first understand the impacts of different sequencing strategies on the performance.

Impact 1. FIG. 11 shows two sample XML documents that conform to a same imaginary DTD schema. We show the depth-first, breadth-first, and constraint sequences (based on constraint $f_2$ in Eq 3 and an unknown user strategy $g_{best}$) of the two documents in Table 3.

The value node on the left-most branch ($v_1$ and $v_5$) corresponds to the 2nd element in the depth-first and the breadth-first sequences. Thus, the 2nd element in these sequences will have many different values. Note this variety is not due to our path-based node encoding. As a document can take any possible value at this position, any node encoding method will encounter this situation.

The problem comes when these sequences are inserted into the index tree. The variety of the 2nd element in the sequences prevents path sharing at the 2nd level of the tree. This leads to a very bushy index. In the extreme case where there is no sharing at all among the inserted sequences, the number of the nodes in the index tree equals to the number of nodes in the XML documents. The index becomes useless since querying on the index is tantamount to scanning the documents one by one.

The flexibility of constraint sequences enables us to avoid this problem. In Table 3, the two particular constraint sequences share a much longer prefix, and the index built on such sequences will have a much smaller size.

Impact 2. Let $\langle p_1, p_2, p_3, p_4 \rangle$ be a query sequence, where $p_1, p_2, p_3$ are the most common paths, and $p_4$ is among the least common paths. For instance, $p_1, p_2, p_3$ are encodings for such XML elements as Project, Unit and Manager, and $p_4$ stands for a value node, say "Johnson".

Based on Algorithm 1, the querying process starts with $p_1$, then $p_2$ and $p_3$. Since they are so common, when we reach $p_3$, we have already traversed a large amount of the index tree. However, few of them will finally lead to $p_4$, which is among the least common paths.

It is clear that $p_4$ has high selectivity, and if it appears frequently in queries, then we should make elements such as $p_4$ appear earlier in the sequences so that the search space can be reduced.

Generally, sequencing must take two things into consideration. First, we want to build a compact index. In other words, we need a sequencing method that maximizes sharing. Second, we want to build a tunable index, so that we can make certain frequently queried and highly selective elements appear earlier in the sequences. In the rest of this section, we show how constraint sequences realize this principle.

Constraint sequences provide the flexibility that can be leveraged to secure a sequencing strategy that observes the aforementioned principle.

Let $p(C|P)$ be the probability that C exists given that node P exists, where C can be either a node or a value. FIG. 12 shows such probabilities in an XML document tree. Next, we show how these probabilities are derived.

If we assume all XML documents have P as their root node, we have $p(P|\epsilon)=1$. If node P, as prescribed by the schema, always has a child node R, then $p(R|P)=1$. Otherwise, the value should reflect the true probability of node P having R as a child. We can either derive or estimate $p(R|P)$ from the semantics in the schema, or approximate it by data sampling.

If C is a value, for example $C=v_1$, then probability $p(C=v_1|P)$ is a combination of two factors: i) the probability that the value node exists under P, and ii) the probability that the value is $v_1$. The 1st factor can be derived in the same way as for the non-value nodes; for the 2nd factor, we consider the range and the distribution of the values. For instance, if $v_1$ is one of the states in US, whose occurrences in the XML dataset follow uniform distribution, then the 2nd factor is 1/55. If, however, $v_1$ is a person's name, and we used hash function with a range of 1000 to handle such values, then the 2nd factor is 1/1000.

Next, we derive $p(C|\text{root})$ for each C. The computation is straightforward. For instance, based on the tree structure in FIG. 13, we can derive $p(L|\text{root})p(L|\text{root})$ by $$p(L|\text{root})=p(L|R)\times p(R|\text{root})=0.4\times 0.9=0.36.$$

FIG. 13 shows the probability $p(C|\text{root})$ for each C.

The probabilities of the nodes and values are associated with a DTD schema, not with any particular XML document, although we may need to sample the documents in order to find out some of the probabilities. Given a set of documents based on a schema, we sequence each of them in such a way that the common prefixes of the outcome sequences are as long as possible. With the probabilities, this is easy to realize. From an XML document, our strategy $g_{best}$ always select nodes whose counterparts in the schema tree have higher probabilities, so that these nodes appear earlier in the sequences.

For instance, based on f2 and $g_{best}$, the XML document of FIG. 13 is sequentialized into the following:

$\langle P, PR, PRU, PBUM, PRL, PRLv_3, Pv_1, PRUMv_2 \rangle$

As another example, the probability-based sequences for the two tree structures in FIG. 11 share a common prefix of length 6 (out of total length 8), while depth-first, breadth-first sequences share a common prefix of length 1.

It is not difficult to prove that $g_{best}$ maximizes sequence sharing and leads to the most compact index. However, two issues must be taken into considerations.

First, when identical siblings are present, the constraint has priority over user strategy $g_{best}$, for we must ensure that we can reconstruct the tree structures from the sequences. Algorithm 2 shows the procedure of generating constraint sequences with respect to constraint $f_2$ and user strategy $g_{best}$. The algorithm generates sequences where for any node x, its ancestor nodes always precedes x. This is not enforced by constraint $f_2$ but by strategy $g_{best}$. Because, according to the way the probabilities are generated, a parent node's probability is at least as high as any of its child nodes.

Second, the sequencing method shall support a tunable mechanism to favor frequently queried patterns. With the probability framework, this is easy to realize. For each node C in an XML schema, we assign a weight w(C), which reflects the query frequency and selectivity of node C. Then, in sequencing, while observing the constraint in use, we arrange nodes by descending order of p'(C|root), which is given by:

$$p'(C|root) = p(C|root) \times w(C). \quad (6)$$

Hereinabove, there has been introduced an XML indexing infrastructure which makes tree patterns a first class citizen in XML query processing. Unlike most indexing methods that directly manipulate tree structures, we build our indexing infrastructure on a much simpler data model: constraint sequences. Previous sequence-based indexing approaches relied on ad hoc sequencing methods, such as the depth-first traversal, the breadth-first traversal, and the Prüffercodes. The performance of sequence-based indexing is hampered for the following reasons: i) ad hoc sequencing does not necessarily preserve the query equivalence a structure match and a subsequence match, and this nonequivalence is often remedied by expensive join operations or document-by-document post-processing; and ii) ad hoc sequencing is not schema aware, or it does not take into consideration the distribution of the data. In other words, ad hoc sequences are not optimized for index and query performance. In contrast, constraint sequencing maps a tree structure to a set of sequential representations, each of which satisfies query equivalence. This, in turn, enables us to form a sequencing strategy based on the data schema and the distribution of the entire dataset, and eventually choose the best sequential representation for a tree structure.

It is to be understood that the present invention, in accordance with at least one presently preferred embodiment, includes a querying arrangement and an indexing arrangement, which together may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

TABLE 1

Depth-first traversal sequences

FIG. 3(b): hP, Pv0, PD, PDL, PDLv1, PD, PDM, PDMv2I
FIG. 3(c): hP, Pv0, PD, PD, PDL, PDLv1, PDM, PDMv2i

TABLE 2

Constraint sequences of FIG. 3 (c)

<P, Pv$_0$, PD, PD, PDL, PDLv$_1$, PDM, PBMv$_3$>
<P, PD, Pv$_0$, PD, PDM, PBMv$_3$, PDL, PDLv$_1$>
<P, PD, PDL, Pv$_0$, PDLv$_1$, PDM, PBMv$_3$, PD>
<P, PD, PDM, PBMv$_3$, Pv$_0$, PDL, PDLv$_1$, PD>
<P, PD, PDM, PBMv$_3$, PDL, Pv$_0$, PDLv$_1$, PD>

TABLE 3

Different Sequencing Methods

DF: (a) <P, Pv$_1$, PR, PRU, PRUM, PRUMv$_2$, PRL, PRLv$_3$>
    (b) <P, Pv$_5$, PR, PRU, PRUM, PRUMv$_6$, PRL, PRLv$_3$>
BF: (a) <P, Pv$_1$, PR, PRU, PRL, PRUM, PRUMv$_2$, PRLv$_3$>
    (b) <P, Pv$_5$, PR, PRU, PRL, PRUM, PRUMv$_6$, PRLv$_3$>
CS: (a) <P, PR, PRU, PRL, PRUM, PRLv$_3$, Pv$_1$, PRUMv$_2$>
    (b) <P, PR, PRU, PRL, PRUM, PRLv$_3$, Pv$_5$, PRUNv$_6$>

Algorithm 1: Subsequence Matching

Input: A query Q
Output: docs ∈ D that contain query structure Q
Let Q = (p$_1$, ..., p$_i$, ...);
Let r = root node of the index tree;
search(r,0,{ });
Function search(v,i,ins)
if i < |Q| then
  i ← i + 1 ;
  I ← horizontal link of p$_i$
  /*
  Perform binary search in I to find nodes ∈ [v$_8$,v$_m$]
  */
  for each node r ∈ I whose ID ∈ [v$_8$,v$_m$] do
    if ∃ x ∈ ins such that x sibling-covers r then
      if r embeds identical siblings then
        ins ← ins ∪ {r}
      end
      search (r,i,isn) ;
    end
  end
else
  output L[v$_8$ ... v$_m$], document id lists of node v and all nodes under v;
end Algorithm 2: Sequencing based on constraint Eq (3)

Input: D: an XML document
      S: XML schema for D
      w(·): weight of the nodes in S
      p(·|·): existence probability of the nodes in S
Output: a sequence representation of D
for each node d ∈ D do
  derive p'(d|root) by Eq (6);
end
Let r be the root node of D;
sequentialize(r);
Function sequentialize(r)
T ← the subtree whose root node is r;
output r;
while T is not empty do
  c ← a node in T with largest p'(c|root);
  if c has identical siblings then
    sequentialize(c);
  else
    output c;
  end
  remove c from T;
end

What is claimed is:

1. An apparatus for providing tree structure indexing, said apparatus comprising:

an integrated circuit implemented in hardware;

a querying arrangement, wherein said querying arrangement queries based on a tree pattern; and an indexing arrangement, said indexing arrangement is adapted to:

provide a set of XML elements containing a pattern similar to the queried tree pattern;
represent the queried tree pattern via a sequence prior to responding to a query by said querying arrangement, wherein the representing comprises:
taking into account the distribution of XML data during sequencing to ensure that an order of each node in the sequence cannot be solely bound by the tree pattern the node represents;
unifying notation and encoding in the sequence at least one element node, attribute node, and value node of the tree pattern, wherein the value node is encoded via a hash value;
determining and including an order of a plurality of encoded nodes in the sequence, wherein the order is relied upon to rebuild the tree pattern;
using path-encoded sequence representation whereby each node in the tree pattern is encoded by a path leading from a root node to an end node;
providing a constraint for use in path encoded-representation based on whether identical sibling nodes are present in the tree pattern, wherein said constraint consists of:
a first constraint $f_1(p_i,p_j) \equiv p_i \subset p_j$ used where there are no identical nodes which is a boolean function $f(\cdot,\cdot)$ that satisfies the following condition: $\forall p_j \epsilon T$ and $\forall t \subset p_j$, there exists one and only one $p_i \epsilon T$ such that $f(p_i,p_j)$=true and $p_i$=t., wherein
$T=\langle p_1,\ldots,p_n \rangle$ is a sequence of path-encoded nodes; and
$f(p_i,p_j)$ embodies the ancestor-descendant relationship between nodes $p_i$ and $p_j$ and $f(p_i,p_j)$ evaluates to true if $p_i$ is an ancestor of $p_j$; and
a forward prefix constraint where there is at least one identical sibling nodes present which eliminates ambiguity of identical sibling nodes, said forward prefix constraint defined by $p_k \subset p_i$ is a forward prefix of $p_i$ if $\forall p_j = p_k, i<k<j$ and there does not exist $p_j = p_k, k<j<i.\_f_2(p_i,p_j) \equiv p_i$, wherein
$p_i$ is the forward prefix of $p_j$; and
$\langle p_1,\ldots,p_n \rangle$ is a sequence of path-encoded nodes; and
applying the constraint to the path-encoded sequence to arrive at a constraint sequence which maps to a unique tree pattern;
provide query-equivalence between a tree pattern match and a subsequence match via subsequence matching and at least one constraint sequence;
respond to a query by said querying arrangement via said subsequence matching;
wherein constraint sequence matching is used to avoid false alarms without join operations and post-processing.

2. The apparatus according to claim 1, wherein the XML elements provided by said indexing arrangement comprise at least one of XML records and XML documents.

3. A method of providing tree structure indexing, said method comprising the steps of:
issuing a query, wherein said query is based on a tree pattern; and
providing indexing responsive to an issued query, said providing indexing step being adapted to:
provide a set of XML elements containing a pattern similar to the queried tree pattern;
represent the queried tree pattern via a sequence prior to responding to a query by said querying arrangement, wherein the representing comprises:
taking into account the distribution of XML data during sequencing to ensure that an order of each node in the sequence cannot be solely bound by the tree pattern the node represents;
unifying notation and encoding in the sequence at least one element node, attribute node, and value node of the tree pattern, wherein the value node is encoded via a hash value;
determining and including an order of a plurality of encoded nodes in the sequence, wherein the order is relied upon to rebuild the tree pattern;
using path-encoded sequence representation whereby each node in the tree pattern is encoded by a path leading from a root node to an end node;
providing a constraint for use in path encoded-representation based on whether identical sibling nodes are present in the tree pattern, wherein said constraint consists of:
a first constraint $f_1(p_i,p_j) \equiv p_i \subset p_j$ used where there are no identical nodes which is a boolean function $f(\cdot,\cdot)$ that satisfies the following condition: $\forall p_j \epsilon T$ and $\forall t \subset p_j$, there exists one and only one $p_i \epsilon T$ such that $f(p_i,p_j)$=true and $p_i$=t., wherein
$T=\langle p_1,\ldots,p_n \rangle$ is a sequence of path-encoded nodes; and
$f(p_i,p_j)$ embodies the ancestor-descendant relationship between nodes $p_i$ and $p_j$ and $f(p_i,p_j)$ evaluates to true if $p_i$ is an ancestor of $p_j$; and
a forward prefix constraint where there is at least one identical sibling nodes present which eliminates ambiguity of identical sibling nodes, said forward prefix constraint defined by $p_k \subset p_i$ is a forward prefix of $p_i$ if $\forall p_j = p_k, i<k<j$ and there does not exist $p_j = p_k, k<j<i.f_2(p_i,p_j) \equiv p_i$, wherein
$p_i$ is the forward prefix of $p_j$; and
$\langle p_1,\ldots,p_n \rangle$ is a sequence of path-encoded nodes; and
applying the constraint to the path-encoded sequence to arrive at a constraint sequence which maps to a unique tree pattern;
provide query-equivalence between a tree pattern match and a subsequence match via subsequence matching and at least one constraint sequence; and
respond to a query by said querying arrangement via said subsequence matching;
wherein constraint sequence matching is used to avoid false alarms without join operations and post-processing.

4. The method according to claim 3, wherein the XML elements provided by said providing indexing step comprise at least one of XML records and XML documents.

5. A program storage device readable by machine, tangibly embodying a program of instructions executable by the machine to perform method steps for providing tree structure indexing, said method comprising the steps of:
issuing a query; and
providing indexing responsive to an issued query, said providing indexing step being adapted to:
provide a set of XML elements containing a pattern similar to the queried tree pattern;
represent the queried tree pattern via a sequence prior to responding to a query by said querying arrangement, wherein the representing comprises:
taking into account the distribution of XML data during sequencing to ensure that an order of each node in the sequence cannot be solely bound by the tree pattern the node represents;

unifying notation and encoding in the sequence at least one element node, attribute node, and value node of the tree pattern, wherein the value node is encoded via a hash value;

determining and including an order of a plurality of encoded nodes in the sequence, wherein the order is relied upon to rebuild the tree pattern;

using path-encoded sequence representation whereby each node in the tree pattern is encoded by a path leading from a root node to an end node;

providing a constraint for use in path encoded-representation based on whether identical sibling nodes are present in the tree pattern, wherein said constraint consists of:

a first constraint $f_1(p_i,p_j) \equiv p_i \subset p_j$ used where there are no identical nodes which is a boolean function $f(\cdot,\cdot)$ that satisfies the following condition: $\forall p_j \epsilon T$ and $\forall t \subset p_j$, there exists one and only one $p_i \epsilon T$ such that $f(p_i,p_j)$=true and $p_i$=t., wherein $T = \langle p_1, \ldots, p_n \rangle$ is a sequence of path-encoded nodes; and $f(p_i,p_j)$ embodies the ancestor-descendant relationship between nodes $p_i$ and $p_j$ and $f(p_i,p_j)$ evaluates to true if $p_i$ is an ancestor of $p_j$; and a forward prefix constraint where there is at least one identical sibling nodes present which eliminates ambiguity of identical sibling nodes, said forward prefix constraint defined by $p_k \subset p_i$ is a forward prefix of $p_i$ if $\forall p_j = p_k, i<k<j$ and there does not exist $p_j = p_k, k<j<i. f_2(p_i,p_j) \equiv p_i$, wherein $p_i$ is the forward prefix of $p_j$; and $\langle p_1, \ldots, p_n \rangle$ is a sequence of path-encoded nodes; and applying the constraint to the path-encoded sequence to arrive at a constraint sequence which maps to a unique tree pattern;

provide query-equivalence between a tree pattern match and a subsequence match via subsequence matching and at least one constraint sequence; and respond to a query by said querying arrangement via said subsequence matching;

wherein constraint sequence matching is used to avoid false alarms without join operations and post-processing.

* * * * *